(12) United States Patent
Knopp et al.

(10) Patent No.: US 6,591,151 B1
(45) Date of Patent: Jul. 8, 2003

(54) PROGRAMMABLE HOUSEHOLD APPLIANCE

(75) Inventors: Lothar Knopp, Berlin (DE); Frank Böldt, Brieselang (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 122 days.

(21) Appl. No.: 09/677,411

(22) Filed: Oct. 2, 2000

Related U.S. Application Data

(63) Continuation of application No. PCT/EP99/02211, filed on Mar. 31, 1999.

(30) Foreign Application Priority Data

Mar. 31, 1998 (DE) .......................................... 198 14 446

(51) Int. Cl.$^7$ ............................................. G05B 15/00
(52) U.S. Cl. ........................... 700/83; 700/17; 700/79; 700/82; 340/825.69; 340/825.72; 345/156; 345/173
(58) Field of Search ............................. 700/83, 12, 17, 700/13, 86, 82–84, 79; 340/825.69, 825.72; 714/1–3; 345/156, 173

(56) References Cited

U.S. PATENT DOCUMENTS

| | | | | |
|---|---|---|---|---|
| 4,418,398 A | * | 11/1983 | Hornung | 713/100 |
| 4,514,798 A | * | 4/1985 | Lesche et al. | 700/83 |
| 4,774,674 A | * | 9/1988 | Otake | 700/1 |
| 5,191,539 A | * | 3/1993 | Harada et al. | 700/196 |
| 5,321,229 A | * | 6/1994 | Holling et al. | 219/445.1 |
| 5,349,344 A | * | 9/1994 | Head | 340/825.23 |
| 5,420,606 A | * | 5/1995 | Begum et al. | 345/156 |
| 5,907,375 A | * | 5/1999 | Nishikawa et al. | 349/12 |
| 5,995,877 A | * | 11/1999 | Brueggemann et al. | 700/85 |
| 6,133,847 A | * | 10/2000 | Yang | 340/825.22 |

* cited by examiner

Primary Examiner—Emanuel Todd Voeltz
Assistant Examiner—Crystal J. Barnes
(74) Attorney, Agent, or Firm—Laurence A. Greenberg; Werner H. Stemer; Ralph E. Locher

(57) ABSTRACT

A programmable control panel includes handles for executing at least a part of the program sequence, and memory cells for controlling an appliance and for storing software codes. The handles are, particularly, push-buttons and switches. The handles are used for inputting individual functions of an individual operating program sequence. Each of the individual functions is assigned to a specific one of the software codes stored in a specific one of the memory cells. The handles are linked to a specific one of the individual functions and to an associated one of the memory cells. A controller includes memory cells that are permanently assigned to the corresponding push-buttons, and operation of the push-buttons results in specific functions being included in the program sequence of the main program for the household appliance. The control panel can be part of a programmable household appliance. In order to simplify the configuration of control panels and the electronic controller, which can be combined with a control panel for different controller variants, each function in the program sequence is assigned a specific software code, and the software code (for example, a numerical code) is stored by entering it in specific memory cells. As a result, the respective function is assigned to the associated push-button or push-buttons.

7 Claims, 1 Drawing Sheet

PROGRAMMABLE HOUSEHOLD APPLIANCE

CROSS-REFERENCE TO RELATED APPLICATION

This is a continuation of copending International Application PCT/EP99/02211, filed Mar. 31, 1999, which designated the United States.

BACKGROUND OF THE INVENTION

Field of the Invention

The invention lies in the field of household appliances. The invention relates to a programmable household appliance having a control panel including push-buttons and switches that disposed for inputting functions of an operating program sequence. Programmable household appliances, in particular washing machines and washer/dryers or combined washer/dryers, have been around for a long time. Microprocessor-controlled program controllers have increased the range of program sequences of such household appliances to such an extent that they now are confusing to operate.

German Published, Non-Prosecuted Patent Application DE 44 22 128 A1 discloses a household appliance having factory preset programs that can be adapted to customer requirements. The adaptation is accomplished by having the electronic controller be freely programmable through a data input and data output unit having a display. To perform programming to vary or add functionality to the existing preset programs, further data and/or parameters must be entered in a manner that is not explained in any detail. The lack of details relating to the nature of the input require additional input handles to be provided according to prior art household appliances of this kind. The handles, themselves, are not necessary for calling up the stored preset programs. The refinement of that application also requires a display.

As set forth herein, the term "handle" is defined as an input mechanism, actuator, controller, or coding operation that conveys information from a user to a programmable controller. Example handles can include push-buttons and switches.

In addition, existing washing machines have control panels with handles for selecting specific program functions. Logic operations for controlling these handles are set up so that trained personnel, for example customer-service technicians, can enter a code for enabling specific control actions, namely, the sequence of operation of individual control handles. The code can be used to call up specific functions or specific customer-service programs. Execution of such programs can give the customer-service technician information about the correct running of the operating program merely by observing the washing machine, as compared to actually running the operating program, which would disadvantageously take too long for the required observation process. On the other hand, suitable codings can be used to call up demonstration programs in which a specific machine operating program sequence is simulated without the functional elements of the washing machine actually being operated. The simulation allows installed program sequences to be demonstrated on the washing machine control panel.

Furthermore, a method for storing and outputting a program that can be modified and executed by a processor is disclosed by European Patent Application A 408 431. The program can be used in conjunction with an electronic program controller for washing machines. The application discloses a capability for the manufacturer of the memory, of the program controller, or of the household appliance to edit a stored program. To edit the stored program, existing parts of the program are suppressed, or are replaced by other parts. The suppression/replacement is done by changing only the data stored in the read only memory, whose address is marked, for example, for each part of a level of a hierarchically broken down memory. The configuration allows memory volume to be saved. However, the disadvantageous factor with all of the above-mentioned prior art programmable household appliances is that the configuration of the control panels and the assignment of the handles or push-buttons are highly specific and require a large number of physically different specific embodiments. Such a requirement leads to a wide range of different assemblies, in particular control panels, and controller boards, which are, in turn, specifically manufactured for the particular assembly and are disposed behind the control panels.

Another prior art household appliance, European Patent Application A 715 235, discloses the ability to edit the contents of a program memory by external action through an opto-electronic interface using an external data processing appliance. However, the configuration requires specific equipment and software, which enormously complicates the measures for adaptation of a program memory to new requirements.

SUMMARY OF THE INVENTION

It is accordingly an object of the invention to provide a programmable household appliance that overcomes the hereinafore-mentioned disadvantages of the heretofore-known devices of this general type and that improves the appliance's programmability such that, particularly in the course of the production process, universal controller boards with appropriate switch elements can be used. Such an improvement considerably reduces customized assemblies.

With the foregoing and other objects in view, there is provided, in accordance with the invention, a programmable household appliance, including a control panel having handles for inputting individual functions of an operating program sequence and for executing at least a part of the program sequence, and memory cells for controlling the appliance and for storing software codes, each of the individual functions of the program sequence being assigned to a specific one of the software codes stored in a specific one of the memory cells, the handles being linked to a specific one of the individual functions and to an associated one of the memory cells.

Thus, a programmable household appliance having a control panel according to the invention is distinguished by the fact that each function in the program sequence is assigned a specific software code (numerical code) that is stored in specific memory cells, and by the fact that each switch can be allocated a specific function from the respectively associated memory cell.

The invention allows a range of considerable advantages to be achieved in comparison with the prior art apparatuses.

The invention firstly achieves a considerable reduction in hardware variants because the universal assemblies provided, in particular the controller boards, are configured universally for a wide range of specific type ranges of household appliances. The boards can be adapted, depending on the type, while in the production process. Such versatility is made possible by the free assignment of functions to the switches of the control elements, which, in turn, provides a major advantage in that model changes and adaptations to the respective household appliance can be carried out without physically changing the assemblies.

In accordance with another feature of the invention, the handles can be push-buttons and/or switches.

In accordance with a further feature of the invention, there are provided a controller, an interface connected to the controller, and a data input device connected to the memory cells through the interface for storing the software codes.

If, in order to store the software code, an interface is connected to the controller, through which interface a data input appliance can be connected to the memory cells, push-buttons can be allocated in any required manner from outside the household appliance. The allocation admittedly requires an external action; however, the household appliances can be automatically set in the appropriate manner at a programming station during production.

On the other hand, a respectively predetermined combination of control actions may also be provided for storing the software code. Then, in some circumstances, the customer service organization can also convert such a household appliance to a new program at the customer's premises once the appliance has been set up.

A further particular advantage results from the flexible configuration of the control panel appearance, in particular, from the selection of the number, position, and shape of the push-buttons in or on the control panel. For example, broad or narrow push-buttons may be selected depending on the appliance type and, furthermore advantageously, the functional sequence can be freely defined.

The configuration results in an advantage that new control elements or operating steps can be added to the respective household appliance without physically changing its control panel board. Addition is done, according to the invention, by allocating the respective switches the desired new functions that the modified household appliance is intended to have.

In accordance with an added feature of the invention, the software codes are numerical codes.

In accordance with an additional feature of the invention, the handles are a respectively predetermined combination of control handles for storing the software code.

In accordance with yet another feature of the invention, at least one of the handles is allocated a software code, in a respective one of the memory cells, associated with an unallocated function.

Particular flexibility in the allocation of the control elements and their construction results from the fact that a switch can be allocated a software code for "unallocated" in the associated memory cell. Thus, even for household appliances whose configuration is particularly simple, the assemblies from considerably more complicated programmable household appliances can be used. The more complicated appliances, however, can be produced relatively more cost effectively, correspondingly, due to their mass-market nature.

"Tailor-made" assemblies in specific configurations and in small quantities are considerably more expensive. The invention reduces such cost by allowing "unallocated" switches either to be covered by broader push-buttons located alongside, without having to have the capability to address them through these push-buttons, or to disappear behind areas of a control panel configured with a correspondingly smaller number of push-button windows.

Thus, for example, it is feasible for three push-button elements for three switches that are present on the board and have corresponding functions to be replaced by one push-button element that covers all three switches and operates only the central switch, with only the single function of the central switch being called up when the one push-button element is operated. The other two functions of the switches located alongside being "unallocated," in other words, these functions are not provided in the example household appliance.

Moreover, using one broader push-button to cover two or more switches has a particular advantage when all the switches are programmed similarly. The configuration improves the switching reliability because a switch, that, for example, may have become permanently switched off due to dirt or breaking, can be replaced by its "neighbor" or one of its "neighbors."

A number of unallocated switches can also advantageously be provided as spares in the assemblies so that functions that are newly introduced into the household appliance in the course of new developments or further developments can be implemented without physically changing the assemblies.

In accordance with a concomitant feature of the invention, the control panel has a film cover softer in an area of the handles than in area where there are no handles.

A control panel in the form of a film cover is a particularly effective and cost-effective refinement when the film cover is softer in the desired push-button areas than in the areas where there are no push-buttons. Therefore, only a slight touch on the corresponding push-buttons in the softer push-button areas is required. Accordingly, any type of individual button configuration is possible, including a modification of only a single push-button in the change to all the other variants.

Other features that are considered as characteristic for the invention are set forth in the appended claims.

Although the invention is illustrated and described herein as embodied in a programmable household appliance, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
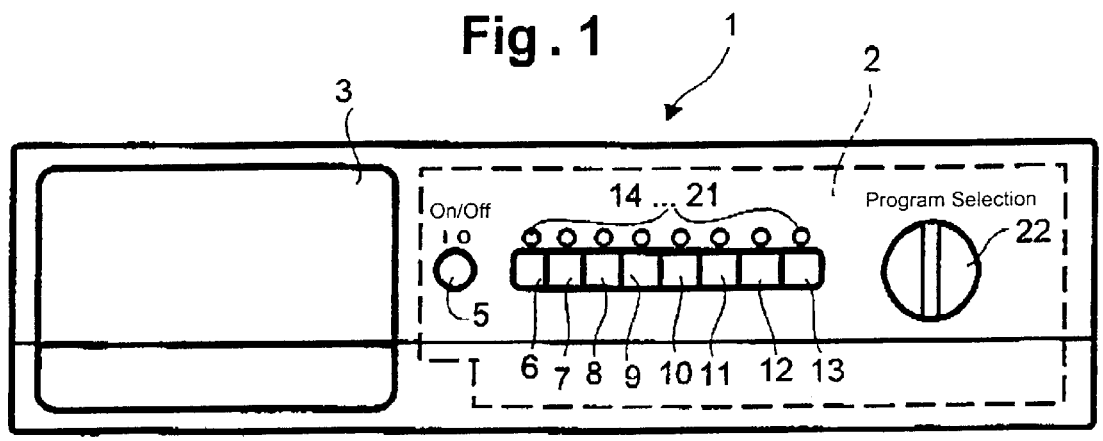
FIG. 1 is a diagrammatic representation of a control panel of a programmable household appliance according to the invention.

In all the figures of the drawing, sub-features and integral parts that correspond to one another bear the same reference symbol in each case.

Referring now to the figures of the drawings in detail and first, particularly to FIG. 1 thereof, there is shown a grip panel 3 for a detergent drawer disposed behind the panel 3. The grip panel 3 is provided in the control panel 1. The control panel 1 also has a push-button 5 for switching the household appliance on and off, and further function push-buttons 6 to 13. The function push-buttons 6 to 13 are assigned switches and light-emitting diodes 14 to 21. The light-emitting diodes not illustrated in further detail but illuminate when the associated button 6 to 13 is operated.

A program selection switch 22 is also provided, which allows the appropriate program to be preselected when rotated. The function keys 6 to 13 allow additional functions to be selected.

Eight function push-buttons are provided in the example illustrated in FIG. 1. In a simplified embodiment in which, for example, it is intended for only switching to four functions, the push-buttons 6 and 7, 8 and 9, 10 and 11, and 12 and 13 can, for example, respectively be replaced by an individual function push-button that is twice as wide. Accordingly, only four function keys would be provided. To change the buttons, the switches located on a board 2 disposed behind the push-buttons 6, 8, 10, and 12 are assigned the "unallocated" coding, in other words, a coding for "unallocated" is stored in the memory cells associated with buttons 6, 8, 10, and 12. Correspondingly, the switches under the former push-buttons 7, 9, 11, and 13 retain their functions or are given new functions. Thus, when the remaining broader function push-buttons are pressed, only the switches under the former push-buttons 7, 9, 11, and 13 produce an influence on the program.

The control panel may also be configured for flexibility such that, for example, a second row of function push-buttons can be provided, in the form of hardware, underneath the first row of function push-buttons 6 to 13. In the course of further developing a programmable household appliance, the additional function push-buttons with associated new functions are then included successively on the control panel, in the same way as that described above.

In order to improve switching reliability, it may also be advantageous for all the switches that are present in the illustrated four-button example, and that are located under the four non-illustrated push-buttons that are twice as wide, to be allocated those functions assigned to the respective covered switches. A failure of one switch of a push-button would then be insignificant because the adjacent switch under the same push-button has the same function allocated to it.

According to the invention, the codings may be implemented as follows.

For example, a coding program may be stored in the control unit of the programmable household appliance. In the coding program, specific combinations of the operation of the function push-buttons 6 to 13 or of their associated switches or the program selection switch 22 correspond to a specific program instruction within/on the board 2. Thus, a coding process could be initiated by operating push-buttons 6, 7, and 8, for example.

Figure 2:
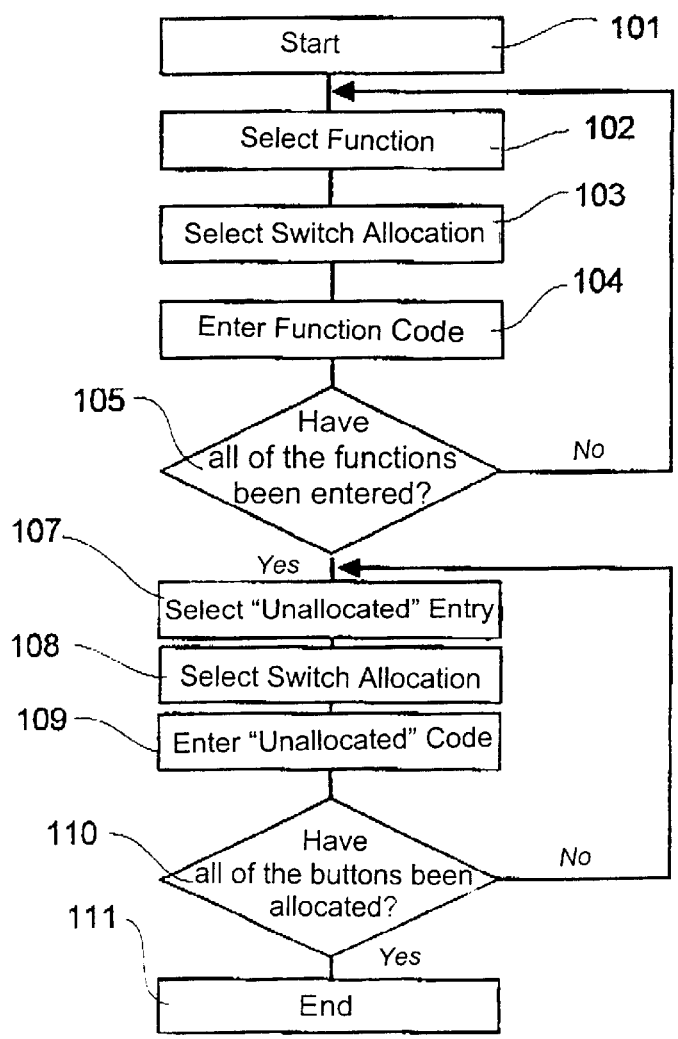
FIG. 2 is a flowchart relating to setting of the functions and their push-button allocation in a programmable household appliance according to the invention.

Such a process is illustrated, for example, in FIG. 2. The operation of specific push-buttons initiates the start step 101. The desired function is then selected in step 102, the selection being equivalent to a corresponding, different switch combination. Even a four-digit code, corresponding to the operation of four switches, provides 24 different instructions.

In a standardized system, each function is assigned a specific switch combination that is now selected in step 102. Using an appropriate code, the switch allocation is then selected in step 103. For example, if the washing program step "intensive" is selected for the function push-button 6, the code number for this program step, as well as the address code for the function push-button 6, is produced on the switches. The entering of the function code is done in step 104. In step 105, a query is made as to whether or not all of the functions have been entered, i.e., appropriately allocated. Correct allocation depends on the respective type of household appliance and is, thus, individually adapted during the production process. If the answer is "no", the selection of the next function is continued in step 102. If the answer is "yes", then, instead of branching back (i.e., selection of the function in step 102), the selection of the "unallocated" entries is started in step 107. In step 108 the selection of the switch allocation for the "unallocated" function or functions is performed. The entry of the code for the unallocated switches continues in step 109. If the switches have not all been allocated, steps 107 to 109 are repeated until all are allocated. The allocation decision is made in step 110 after which, if all the switches have been allocated, the program ends in step 111.

Therefore, the programmable household appliance according to the invention has a very high level of flexibility for the application of its function push-buttons and switches and can be adapted to corresponding, type-specific requirements. The appliance hardware is also suitable for future implementations of new functions.

We claim:

1. A programmable household appliance, comprising;

a control panel having handles for inputting individual functions of an operating program sequence and for executing at least a part of the program sequence, said handles having push buttons and switches to be actuated by said push buttons; and memory cells for controlling the appliance and for storing software codes, said memory cells being assigned to corresponding switches to be linked to the individual functions of the operation program sequence by actuating said switches;

each of the individual functions of the program sequence being assigned to a specific one of the software codes stored in a specific one of the memory cells;

each of said switches being linked to a specific one of the individual functions and to an associated one of said memory cells;

at least some of said push buttons being assigned to two switches with the same function to assure the function of said push button in case of failure of one switch.

2. The household appliance according to claim 1, wherein said control panel has a film cover softer in an area of said handles than in area where there are no handles.

3. The household appliance according to claim 1, wherein the software codes are numerical codes.

4. The household appliance according to claim 1, including a controller, an interface connected to said controller, and a data input device connected to said memory cells through said interface for storing the software codes.

5. The household appliance according to claim 1, wherein each software code corresponds to a respective predetermined operation action.

6. The household appliance according to claim 1, wherein at least one of said handles is allocated a software code, in a respective one of said memory cells, associated with an unallocated function.

7. A control panel, comprising:

handles for inputting individual functions of an operating program sequence and for executing at least a part of the program sequence, said handles having push buttons and switches to be actuated by said push buttons; and memory cells for storing software codes, said memory cells being assigned to corresponding switches to be linked to the individual functions of the operation program sequence by actuating said switches;

each of the individual functions of the program sequence being assigned to a specific one of the software codes stored in a specific one of the memory cells;

each of said switches being linked to a specific one of the individual functions and to an associated one of said memory cells;

at least some of said push buttons being assigned to two switches with the same function to assure the function of said push button in case of failure of one switch.

* * * * *